United States Patent
Lin et al.

(10) Patent No.: US 7,988,352 B2
(45) Date of Patent: Aug. 2, 2011

(54) PROBE STRUCTURE

(75) Inventors: Kevin Lin, HsinChu (TW); Vincent Weng, HsinChu (TW); Joy Liao, HsinChu (TW)

(73) Assignee: Radiant Innovation Inc., Hsinchu (TW)

( * ) Notice: Subject to any disclaimer, the term of this patent is extended or adjusted under 35 U.S.C. 154(b) by 229 days.

(21) Appl. No.: 12/318,977

(22) Filed: Jan. 14, 2009

(65) Prior Publication Data
US 2009/0129435 A1    May 21, 2009

Related U.S. Application Data

(63) Continuation-in-part of application No. 11/590,886, filed on Nov. 1, 2006, now abandoned.

(51) Int. Cl.
*G01J 5/00* (2006.01)
*G01K 5/00* (2006.01)

(52) U.S. Cl. ......... 374/121; 374/131; 374/208; 600/474

(58) Field of Classification Search ................. 374/121, 374/208, 131; 600/474
See application file for complete search history.

(56) References Cited

U.S. PATENT DOCUMENTS

| | | | |
|---|---|---|---|
| 4,005,605 A | 2/1977 | Michael | |
| 4,636,091 A | 1/1987 | Pompei et al. | |
| 5,018,872 A | 5/1991 | Suszynski et al. | |
| 5,066,142 A | 11/1991 | DeFrank et al. | |
| 5,293,877 A | 3/1994 | O'Hara et al. | |
| 5,325,863 A | 7/1994 | Pompei | |
| 5,458,121 A | 10/1995 | Harada | |
| 5,857,775 A | 1/1999 | Vodzak et al. | |
| 5,871,279 A | 2/1999 | Mooradian et al. | |
| 5,874,736 A | 2/1999 | Pompei | |
| 6,749,334 B2 | 6/2004 | Lin | |
| 7,346,386 B2 | 3/2008 | Pompei | |
| 2002/0176479 A1 | 11/2002 | Hur et al. | |
| 2004/0022297 A1* | 2/2004 | Tabata et al. ................. | 374/120 |

FOREIGN PATENT DOCUMENTS
EP     1302761 A1    4/2003
* cited by examiner

*Primary Examiner* — Lisa M Caputo
*Assistant Examiner* — Mirellys Jagan
(74) *Attorney, Agent, or Firm* — Rosenberg, Klein & Lee

(57) ABSTRACT

The present invention discloses an improved probe structure, which is installed in the body of an infrared clinical thermometer and comprises a plastic hollow casing having an opening; a curved block annularly arranged inside the opening; a hollow sleeve arranged inside the casing and along the perimeter of the opening; a temperature sensor arranged inside sleeve and below the curved block; a support element arranged inside the sleeve and supporting the temperature sensor; and a thermal insulation ring encircling the temperature sensor and pressing against the inner wall of the sleeve. The thermal insulation ring has an outer diameter larger than a width of the temperature sensor, and an air gap is thus formed between the temperature sensor and the inner wall of the sleeve; the top of the thermal insulation ring has an altitude higher than the top of the temperature sensor, and another air gap is thus formed between the temperature sensor and the curved block. Thereby is effectively retarded heat conduction from the external to the temperature sensor.

6 Claims, 7 Drawing Sheets

PROBE STRUCTURE

RELATED APPLICATIONS

The present invention is a continuation-in-part application of the application that is entitled "IMPROVED PROBE STRUCTURE" (Application NO.: U.S. Ser. No. 11/590,886), filed Nov. 1, 2006 now abandoned which is filed presently with the U.S. Patent & Trademark Office, and which is used herein for reference in its entirety.

BACKGROUND OF THE INVENTION

1. Field of the Invention

The present invention relates to an improved probe structure, particularly to an improve probe structure, which can effectively separate the probe from the external heat source.

2. Description of the Related Art

The ear thermometer detects the infrared rays radiated by the eardrum to learn the body temperature. The eardrum is located inside the skull and near the hypothalamus—the temperature control center of the body. As the carotid fully supplies blood to the eardrum, the eardrum can promptly reflect the central temperature variation of the body. The ear temperature can be used to calculate the oral temperature and rectal temperature for clinic reference. As the ear thermometer can rapidly output temperature accurately and is easy to operate, it has been the mainstream instrument for body temperature measurement.

Generally, isolating the ear thermometer from the influence of external heat can effectively increase the accuracy thereof. Therefore, there are many designs to achieve the function. Refer to FIG. 1 for a U.S. Pat. No. 4,636,091. In the prior art, the sensor 10 is arranged inside a low-conductivity plastic sleeve 12, and a high-conductivity casing 14 separates the plastic sleeve 12 from the environment. The bottom of the sensor 10 contacts a cast piece 16 made of a high-conductivity ceramic material, and the cast piece 16 can fast conduct from the sensor 10 the heat caused by radiation. The prior-art patent uses the plastic sleeve 12 to separate the sensor 10 from the external heat conducted by the casing 14. Refer to FIG. 2. In the abovementioned design, electric capacity may simulate thermal capacity, and electric resistance may simulate thermal resistance. Thus, the path via which the external heat is conducted to the sensor 10 may be regarded as that the external heat sequentially passes through the casing 14 simulated by an electric capacitor 18, the plastic sleeve 12 simulated by an electric resistor 20, the cast piece 16 simulated by an electric capacitor 16, and a metallic sensor housing (not shown in the drawing) simulated by an electric capacitor 22.

Refer to FIG. 3 for a U.S. Pat. No. 5,018,872. In the prior art, the probe structure comprises a plastic hose 24, a metallic shelter 26 arranged inside the plastic hose 24, a sensor 28 arranged inside the metallic shelter 26, and a radiator 30 contacting the bottom of the sensor 28 to fast dissipate the heat passing through the plastic hose 24 and reaching the metallic shelter 28. Refer to FIG. 3. In the design, electric capacity may also simulate thermal capacity, and electric resistance may also simulate thermal resistance. Thus, the path via which the external heat is conducted to the sensor 28 may be regarded as that the external heat sequentially passes through the plastic hose 24 simulated by an electric resistor 32, the radiator 30 simulated by an electric capacitor 34, and the metallic shelter 26 simulated by an electric capacitor 36.

Refer to FIG. 5 for a U.S. Pat. No. 5,874,736. In the prior art, the path via which the external heat is conducted to the sensor 38 may be regarded as that the external heat sequentially passes through an electric resistance (simulating the sleeve 40), an electric capacitor (simulating the radiator 42), and an electric capacitor (simulating a flange 44 in the rear of the metallic encapsulating casing of the sensor 38). In a U.S. Pat. No. 6,743,346, the external heat is conducted to the sensor via a path of an electric resistance (a sleeve), an electric capacitor (a radiator), and an electric capacitor (a metallic encapsulating casing of the sensor).

The abovementioned prior-art patents respectively use different structures to retard the heat conducted from the external to the sensor. However, they all have the same mode-one electric resistor together with several electric capacitors. Therefore, the abovementioned prior-art patents have about identical effect in separating the sensor from the influence of external heat.

Accordingly, the present invention proposes an improved probe structure to effectively solve the problems of the conventional probe stricture.

SUMMARY OF THE INVENTION

The primary objective of the present invention is to provide an improved probe structure, which uses a thermal-insulation ring to effectively reduce the influence of external heat on infrared detection and greatly promote the accuracy of an ear thermometer.

Another objective of the present invention is to provide an improved probe structure, wherein a curved block is arranged inside the opening of the probe to control the detection angle of the temperature sensor and promote the accuracy of temperature measurement.

To achieve the abovementioned objectives, the present invention proposes an improved probe structure, which is installed in the body of an infrared clinical thermometer and comprises a plastic hollow casing having an opening; a curved block annularly arranged inside the opening; a hollow sleeve arranged inside the casing and along a perimeter of the opening; a temperature sensor arranged inside sleeve and below the curved block; a support element arranged inside the sleeve and supporting the temperature sensor; and a thermal insulation ring encircling the temperature sensor and pressing against an inner wall of the sleeve. The thermal insulation ring has an outer diameter larger than a width of the temperature sensor, and a first air gap is thus formed between the temperature sensor and the inner wall of the sleeve; the top of the thermal insulation ring has an altitude higher than the top of the temperature sensor, and a second air gap is thus formed between the temperature sensor and the curved block.

Below, the embodiments are described in detail to make easily understood the objectives, technical contents, characteristics and accomplishments of the present invention.

DETAILED DESCRIPTION OF THE INVENTION

The present invention proposes an improved probe structure, which is installed in the body of an infrared clinical thermometer, such as a forehead thermometer or an ear thermometer, to promote the accuracy of temperature measurement.

Figure 1:
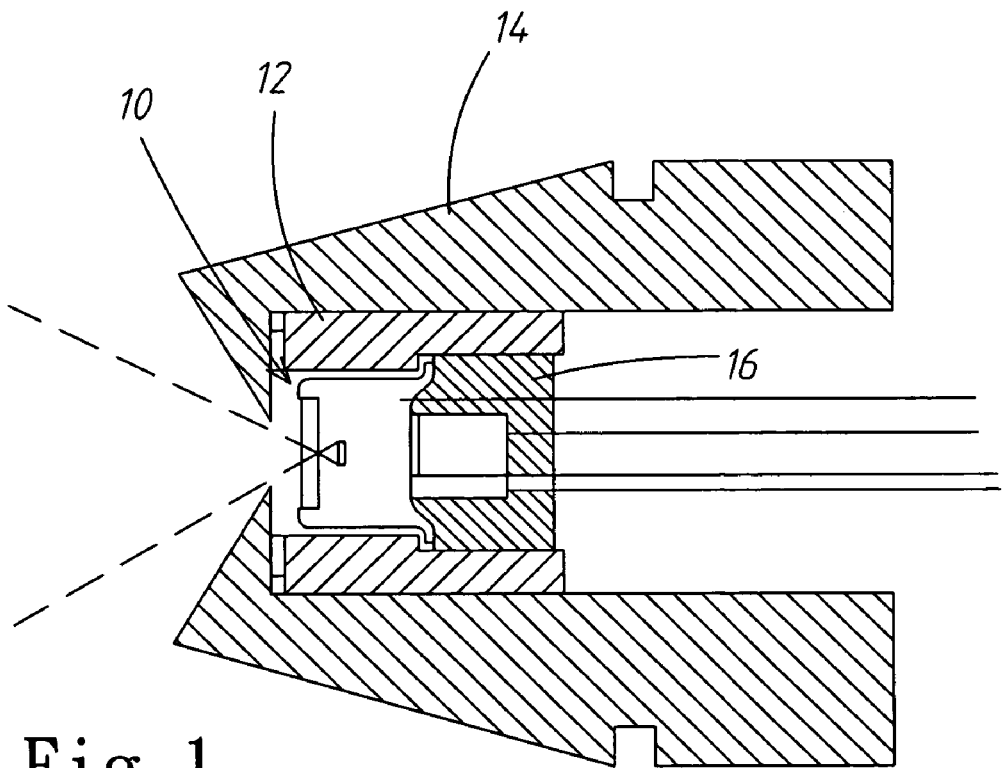
FIG. 1 is a diagram schematically showing a conventional technology.
Figure 2:
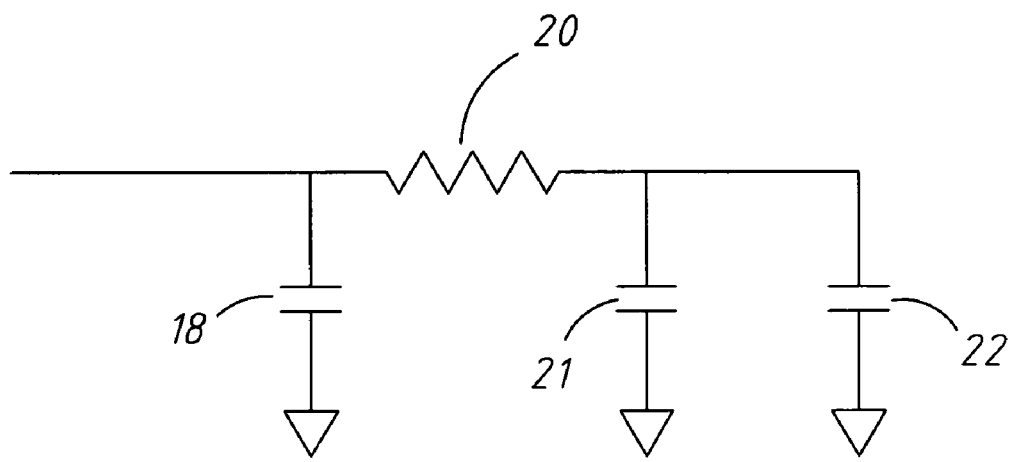
FIG. 2 is a diagram showing an equivalent circuit of a path via which external heat is conducted to the sensor in the conventional technology shown in FIG. 1.
Figure 3:
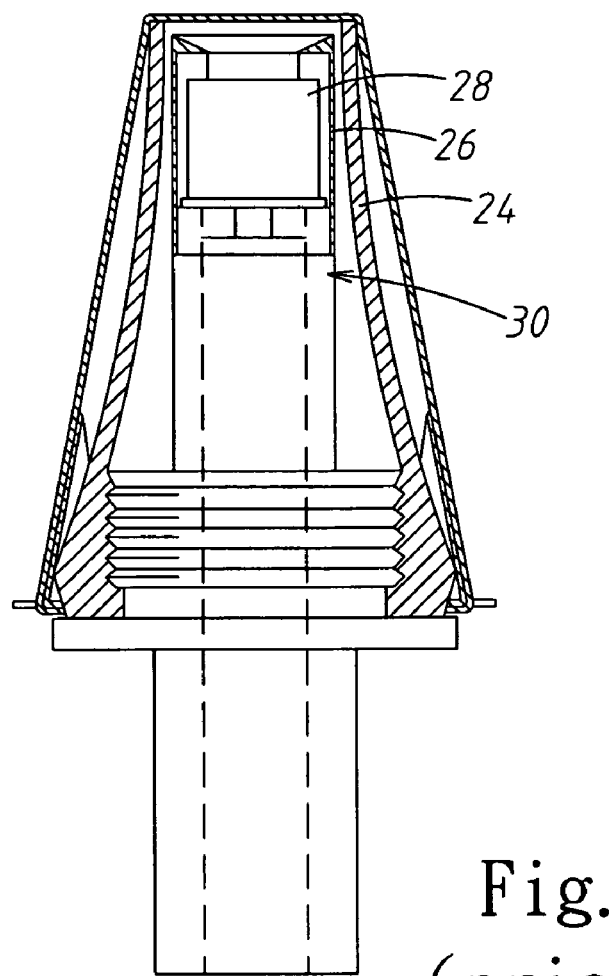
FIG. 3 is a diagram schematically showing another conventional technology.
Figure 4:
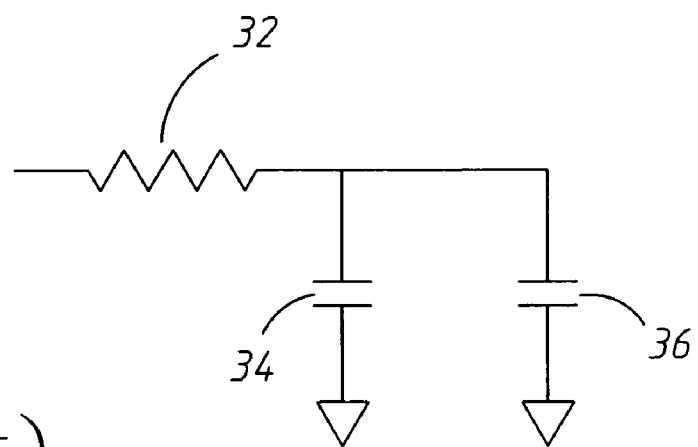
FIG. 4 is a diagram showing an equivalent circuit of a path via which external heat is conducted to the sensor in the conventional technology shown in FIG. 3.
Figure 5:
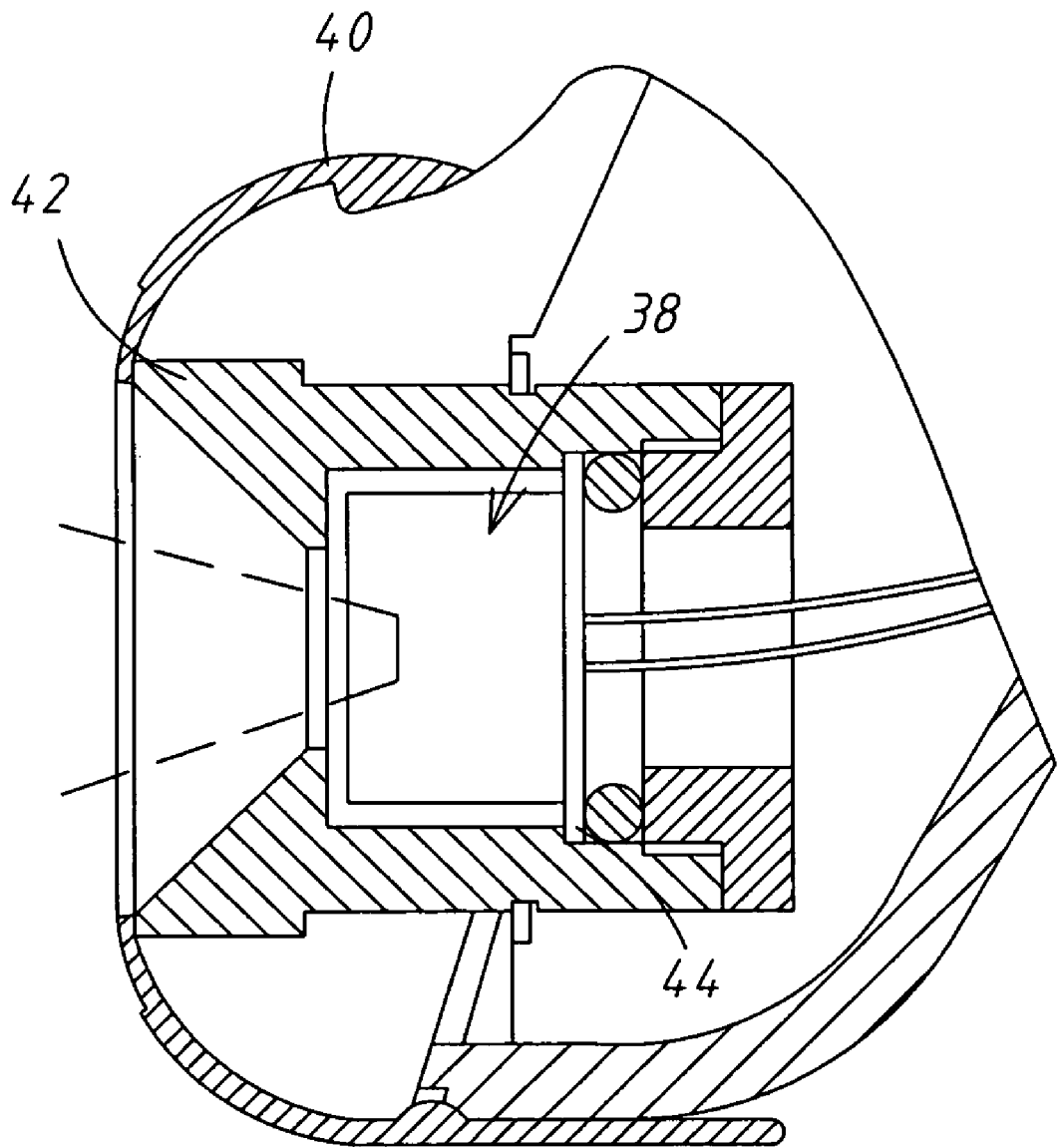
FIG. 5 is a diagram schematically showing a further conventional technology.
Figure 6:
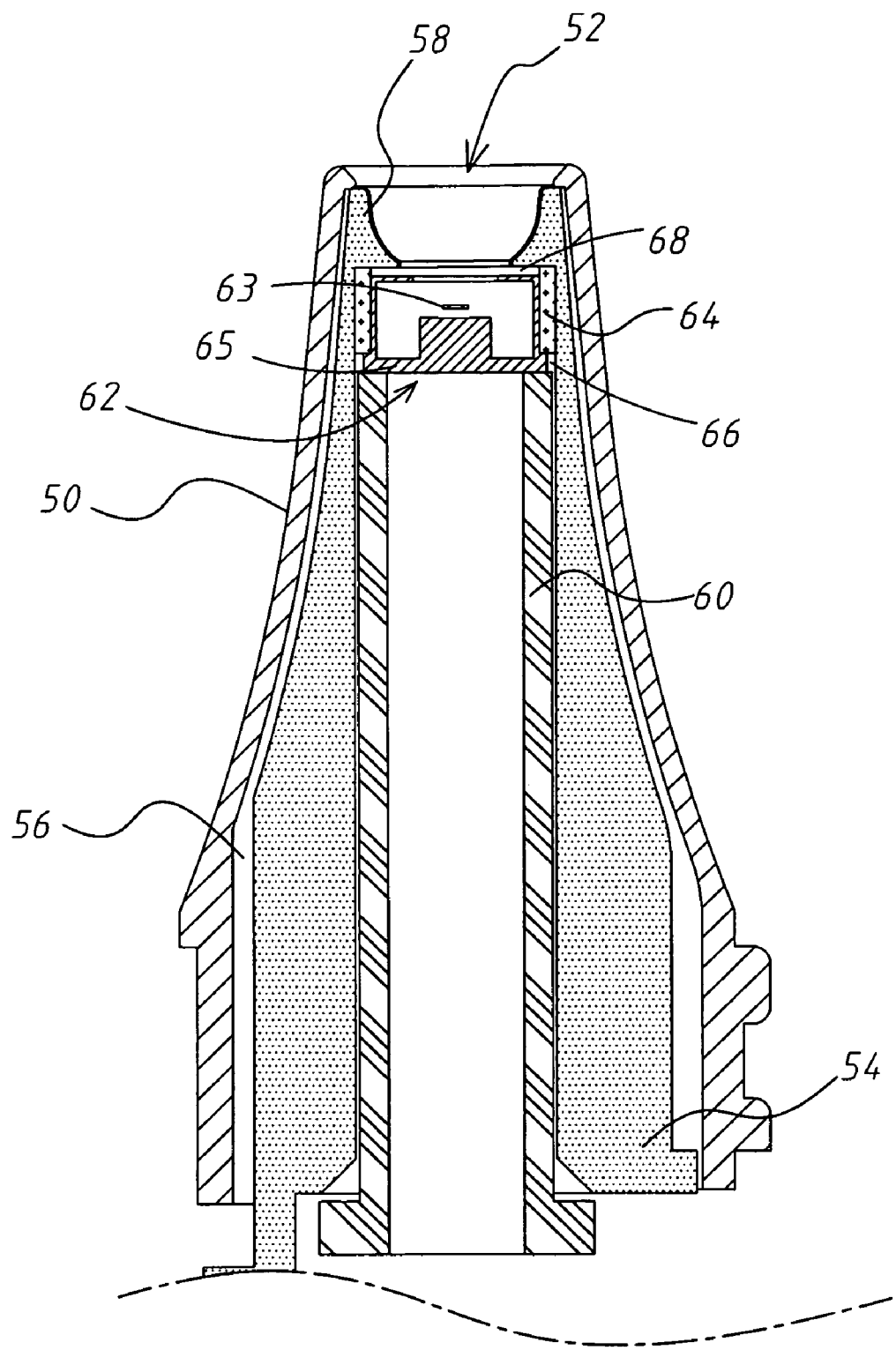
FIG. 6 is a sectional view schematically showing an improved probe structure according to a first embodiment of the present invention.
Figure 7:
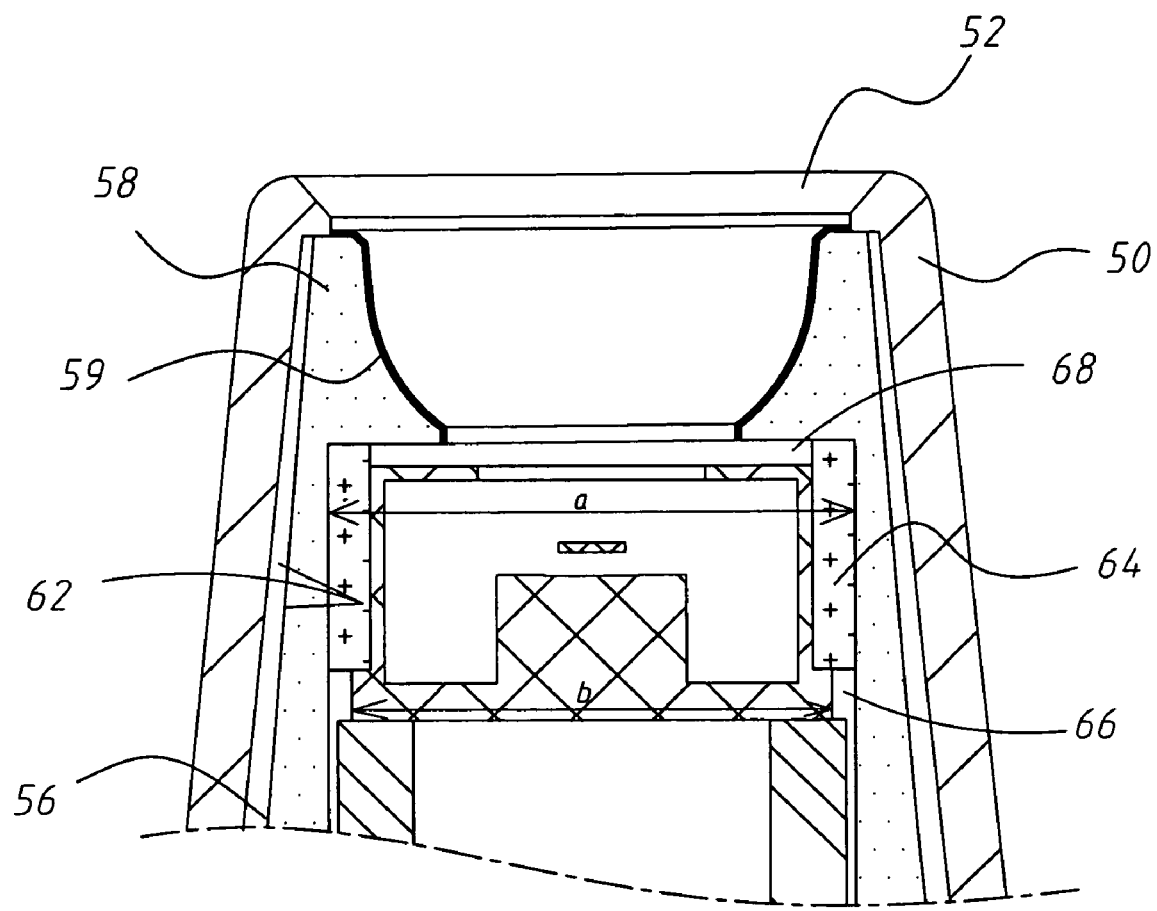
FIG. 7 is a partially enlarged view schematically of the improved probe structure according to the first embodiment of the present invention.

Refer to FIG. 6 and FIG. 7 respectively a sectional view and a partially enlarged view schematically showing an improved probe structure according to one embodiment of the present invention. The improved probe structure of the present invention comprises a plastic casing 50 with an opening 52; a metallic sleeve 54 arranged inside the plastic casing 50 and along the inner rim of the opening 52, wherein a gap 56 is formed between the plastic casing 50 and the metallic sleeve 54 to increase the thermal insulation; a curved block 58 arranged along the inner rim of the top of the metallic sleeve 54, having a curvature of about 30-85 degrees, and plated with a coating 59 to increase reflectivity and decrease infrared radiation, wherein the curved block 58 and the metallic sleeve 54 are fabricated into a one-piece component; a support element 60 arranged inside the metallic sleeve 54, wherein the support element 60 may be a round tube; a temperature sensor 62 arranged on the top of the support element 60 and including a thermocouple 63 and an encapsulation base 65 sustaining the thermocouple 63, wherein the support element 60 supports the temperature sensor 62 to exist between the support element 60 and the curved block 58, and the curved block 58 thus encircles the top surface of the temperature sensor 62; a thermal insulation ring 64 encircling the temperature sensor 62 and pressing against the inner wall of the metallic sleeve 54, wherein the thermal insulation ring 64 has an outer diameter a greater than the width b of the temperature sensor 62, and an air gap 66 is thus formed between the temperature sensor 62 and the inner wall of the metallic sleeve 54, and wherein the top of the thermal insulation ring 64 has an altitude higher than the top of the temperature sensor 62, and an air gap 68 is thus formed between the temperature sensor 62 and the curved block 58.

Figure 8:
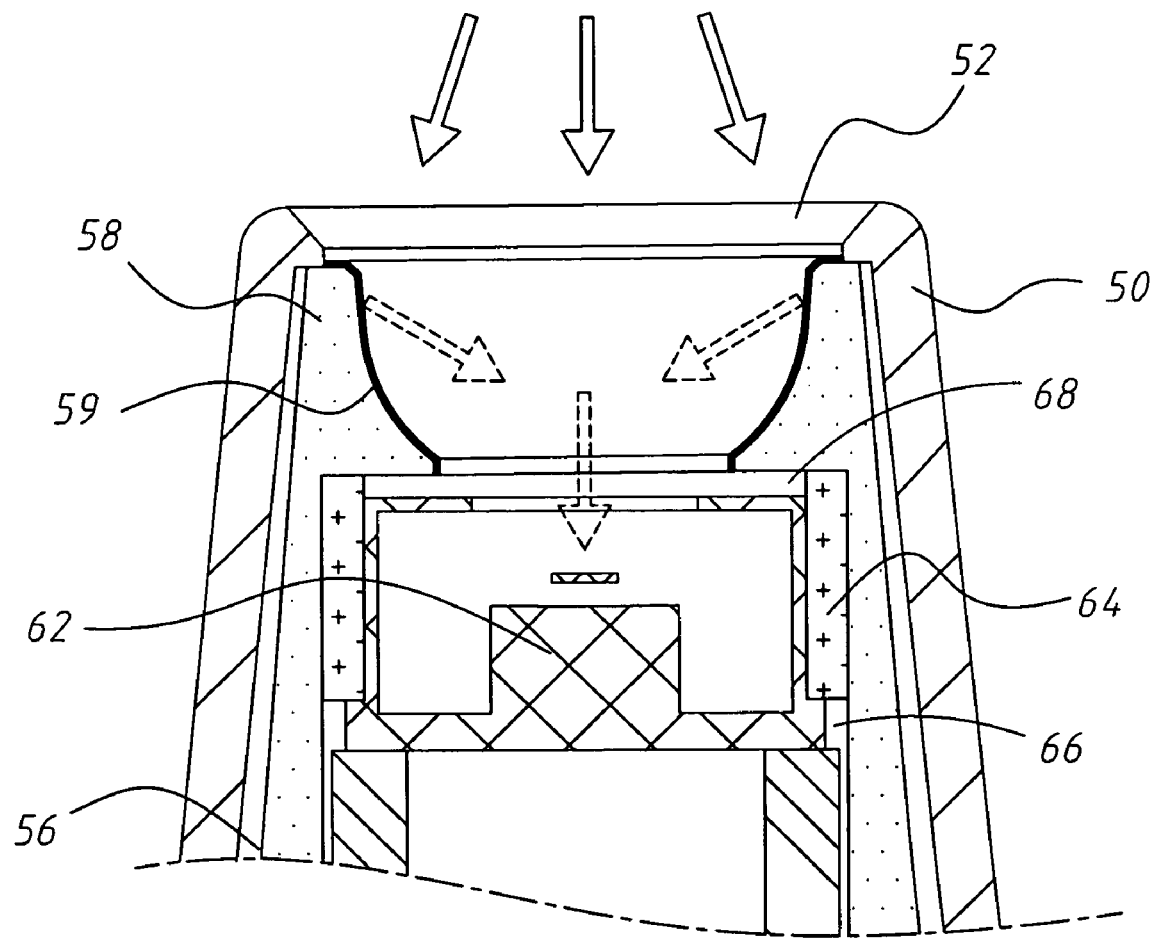
FIG. 8 is a diagram schematically showing that infrared rays are received by the improved probe structure according to the first embodiment of the present invention.

Refer to FIG. 8. When intending to use the ear thermometer to measure the body temperature, the user inserts the probe structure into his ear. The temperature sensor 62 receives infrared rays, wherein the coating 59 on the curved block 58 retards or reflects the infrared rays having too large a scattering angle and concentrates other infrared rays on the temperature sensor 62 to reduce the interference of temperature noise and increase the accuracy of temperature measurement.

Figure 9:
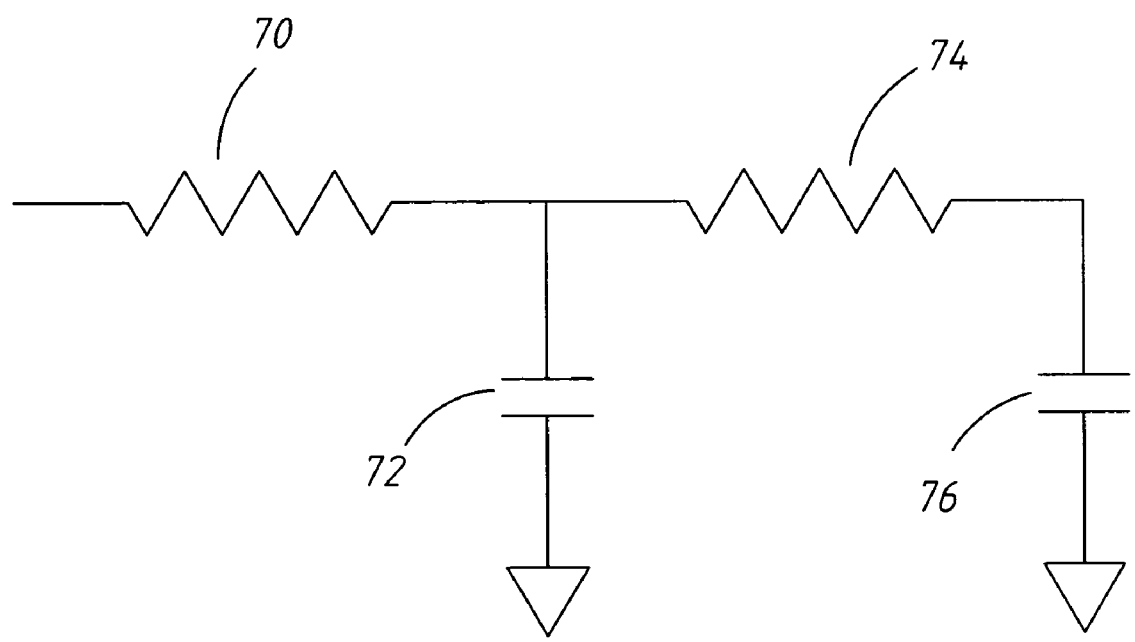
FIG. 9 is a diagram showing an equivalent circuit of a path via which external heat is conducted to the sensor in the improved probe structure according to the first embodiment of the present invention.

Refer to FIG. 9 for an equivalent circuit of a path via which external heat is conducted to the temperature sensor in the improved probe structure according to one embodiment of the present invention. In the improved probe structure of the present invention, external heat is conducted to the temperature sensor 62 via a path of the low-thermal conductivity plastic casing 50 (simulated by an electric resistor 70), the metallic sleeve 54 (simulated by an electric capacitor 72), the thermal insulation ring 64 (simulated by an electric resistor 74), and a sensor encapsulation housing (simulated by an electric capacitor 76). Thereby, the present invention can more effectively separate the temperature sensor from the interference of external heat than the conventional technology. Thus, the present invention can greatly promote the accuracy of temperature measurement of an ear thermometer.

In the present invention, a curved block is arranged inside the opening of the probe to decrease the detection angle to more precisely detect the eardrum temperature and obtain a higher-accuracy temperature measurement result. As the curved block can decrease the sensitivity of the temperature sensor to heat conduction, the gap between the casing and the temperature sensor can be decreased to reduce the volume of the probe structure. Besides, a thermal insulation ring is used to retard the conduction of external heat to the temperature sensor and reduce the influence of external heat on infrared detection, which further promotes the accuracy of temperature measurement of an ear thermometer.

The embodiments described above are only to exemplify the present invention but not to limit the scope of the present invention. Therefore, any equivalent modification or variation according to the characteristics or spirit of the present invention is to be also included within the scope of the present invention.

What is claimed is:

1. An improved probe structure, installed in a body of an infrared clinical thermometer, comprising:
    a plastic hollow casing having an opening;
    a hollow sleeve having a front end defining a curved block, said hollow sleeve being arranged inside said casing and said curved block being disposed in juxtaposition with a perimeter of said opening, the curved block having an arcuate concave inner surface plated with a coating to increase reflectivity thereof for thereby concentrating infrared radiation from a surface being measured and reflect infrared radiation from divergent sources;
    a temperature sensor arranged inside said sleeve and below said curved block, said sensor including a housing and a temperature sensing element disposed within said housing;
    a support element arranged inside said sleeve and supporting said temperature sensor; and
    a thermal insulation ring encircling said temperature sensor and pressing against an inner wall of said sleeve, said thermal insulation ring having an upper edge disposed contiguous with a bottom edge of said curved block, wherein said thermal insulation ring has an outer diameter larger than a diameter of said housing of said temperature sensor, and a first gap is thus formed between said temperature sensor and said inner wall of said sleeve, and wherein said upper edge of said thermal insulation ring has an altitude higher than a top of said housing of said temperature sensor to thereby space said top of said housing from said curved block to define a second air gap between said top of said housing and said bottom edge of said curved block.

2. An improved probe structure, installed in a body of an infrared clinical thermometer, comprising:
    a plastic hollow casing having an opening;
    a hollow sleeve having a front end defining a curved block, said hollow sleeve being arranged inside said casing and said curved block having an arcuate concave inner surface with a curvature in a range of 30-85 degrees disposed in juxtaposition with a perimeter of said opening to concentrate infrared radiation from a surface being measured and reflect infrared radiation from divergent sources;

a temperature sensor arranged inside said sleeve and below said curved block, said sensor including (a) a housing, (b) an encapsulation base closing a first end of said housing and having a diameter greater than a diameter of said housing, and (c) a temperature sensing element disposed within said housing and supported by said encapsulation base;

a support element arranged inside said sleeve and supporting said temperature sensor; and a thermal insulation ring encircling said temperature sensor and pressing against an inner wall of said sleeve, said thermal insulation ring having an upper edge disposed contiguous with a bottom edge of said curved block, wherein said thermal insulation ring has an outer diameter larger than said diameter of said encapsulation base, and a first gap is thus formed between said temperature sensor and said inner wall of said sleeve, and wherein said upper edge of said thermal insulation ring has an altitude higher than a second end of said housing of said temperature sensor to thereby space a second end of said housing from said curved block to define a second air gap between said second end of said housing and said bottom edge of said curved block.

3. The improved probe structure according to claim 2, wherein said sleeve is made of metallic material.

4. The improved probe structure according to claim 2, wherein said infrared clinical thermometer is a forehead thermometer or an ear thermometer.

5. The improved probe structure according to claim 2, wherein a third air gap is formed between said casing and said sleeve to retard interference of temperatures of external environments.

6. The improved probe structure according to claim 2, wherein said arcuate concave inner surface of said curved block is plated with a coating to increase reflectivity and reduce divergent infrared radiation.

* * * * *